(12) United States Patent
Hurlin et al.

(10) Patent No.: US 8,579,078 B2
(45) Date of Patent: Nov. 12, 2013

(54) ACOUSTIC PANEL FOR A TURBOJET ENGINE NACELLE, WITH IN-BUILT FASTENERS

(71) Applicant: Aircelle, Gonfreville l'Orcher (FR)

(72) Inventors: Herve Hurlin, Igny (FR); Nicolas Dezeustre, Le Harve (FR); Wouter Balk, Melun (FR); Bertrand Desjoyeaux, Sainte Adresse (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/749,215

(22) Filed: Jan. 24, 2013

(65) Prior Publication Data

US 2013/0133977 A1    May 30, 2013

Related U.S. Application Data

(63) Continuation of application No. PCT/FR2011/051628, filed on Jul. 7, 2011.

(30) Foreign Application Priority Data

Jul. 27, 2010   (FR) ...................................... 10 56136

(51) Int. Cl.
   *E04B 1/82*   (2006.01)
(52) U.S. Cl.
   USPC ............ 181/288; 181/213; 181/214; 181/284

(58) Field of Classification Search
   USPC .................. 181/213, 214, 288, 284; 244/1 N
   See application file for complete search history.

(56) References Cited

U.S. PATENT DOCUMENTS

| 4,861,208 | A | * | 8/1989 | Boundy ........................ 411/339 |
| 5,831,225 | A | * | 11/1998 | Campbell ..................... 181/284 |
| 6,966,594 | B2 | * | 11/2005 | Wojewnik ..................... 296/39.3 |
| 2004/0094359 | A1 | * | 5/2004 | Porte et al. .................... 181/214 |
| 2008/0017442 | A1 | * | 1/2008 | Douglas ........................ 181/213 |
| 2008/0135329 | A1 | * | 6/2008 | Strunk et al. .................. 181/214 |
| 2008/0185215 | A2 | * | 8/2008 | Strunk .......................... 181/214 |
| 2009/0242321 | A1 | | 10/2009 | Harper |
| 2010/0236862 | A1 | * | 9/2010 | Sternberger et al. .......... 181/213 |

FOREIGN PATENT DOCUMENTS

| EP | 1020845 | 12/1999 |
| FR | 2936223 | 9/2008 |
| FR | 2926791 | 7/2009 |
| GB | 2452476 B | 1/2010 |
| WO | WO/2009/147307 | 12/2009 |

* cited by examiner

*Primary Examiner* — Forrest M Phillips

(74) *Attorney, Agent, or Firm* — Brinks Hofer Gilson & Lione

(57) ABSTRACT

An acoustic panel is provided that includes at least one cellular core arranged between at least an internal skin and an external skin, wherein the external skin incorporates at least one fastener able to collaborate in a disconnectable fashion with a complementary fastener associated with a structure to which it is to be attached.

10 Claims, 3 Drawing Sheets

ACOUSTIC PANEL FOR A TURBOJET ENGINE NACELLE, WITH IN-BUILT FASTENERS

CROSS-REFERENCE TO RELATED APPLICATIONS

This application is a continuation of International Application No. PCT/FR2011/051628 filed on Jul. 7, 2011, which claims the benefit of FR 10/56136, filed on Jul. 27, 2010. The disclosures of the above applications are incorporated herein by reference.

FIELD

The present disclosure relates to an acoustic panel of the cellular panel type, in particular for a turbojet engine nacelle structure, said acoustic panel being equipped with fastening means.

BACKGROUND

The statements in this section merely provide background information related to the present disclosure and may not constitute prior art.

Airplane turbojet engines generate significant noise pollution. There is a high demand to reduce that pollution, particularly inasmuch as the turbojet engines used are becoming increasingly powerful. The design of the nacelle surrounding the turbojet engine contributes in large part to reducing that noise pollution.

In order to further improve the acoustic performance of aircrafts, nacelles are equipped with acoustic panels aiming to attenuate the noises due to the circulation of flows of air through the turbojet engine as well as the vibrations of the structures of the nacelle. Thus, acoustic panels are generally arranged along a circulation tunnel for the flows of air generated by the turbojet engine, from the air inlet upstream to its downstream outlet.

Acoustic panels are sandwich-type structures well known for absorbing these noises. These panels typically include one or more layers of cellular core structures (commonly called "honeycomb" structures). These layers can then be coated on their so-called external surface, i.e. the surface furthest from the aerodynamic flow, with an air-impermeable skin, said to be "solid," and on the internal surface, i.e. the surface closest to the aerodynamic flow, with an air-permeable perforated skin, said to be "acoustic."

In a known manner, the cellular core structure is made from attached cellular units having cells that are generally hexagonal or elliptical.

Other structures, designed in particular to meet specific acoustic criteria, may be used. Examples in particular include linear degree of freedom (LDOF) panels, where a fine metal grate is glued on the acoustic skin, and so-called double degree of freedom (2DOF) panels comprising two levels of cellular cores separated by a porous septum.

In general, the present disclosure is not limited to a particular acoustic panel structure and will be compatible with these various structures.

One of the main drawbacks is the fastening of these panels. In fact, these panels are generally fastened by screws that can be disassembled so as to allow and facilitate maintenance or replacement operations.

These screws may either pass through the panel at the honeycomb core, which is then locally reinforced, in particular by the addition of resin, a solid reinforcement, or an insert, or pass through the panel at a so-called skin return area where the honeycomb is locally eliminated.

In all cases, it will be understood that the acoustic surface of the panel is reduced as a result.

Another possibility consists of gluing the panel or riveting it on its solid external skin, as for example described in document EP 1,020,845, but in that case, the panels cannot be disassembled. Furthermore, in the case of document EP 1,020,845, it will be noted that the rivets still penetrate the inside of the panel, which still reduces the effective acoustic surface.

Document U.S. 2009/0242321 proposes one such solution by providing lateral fastening edges. It should nevertheless be noted that the presence of these fastening edges lengthens the panel, which can be problematic in areas with a defined and precisely delimited space. In that case, with an identical length, there will be a loss of acoustic surface.

SUMMARY

The present disclosure proposes an alternative solution responding to the drawbacks set forth above, and to that end consists of an acoustic panel comprising at least one cellular core arranged between at least an internal skin and an external skin, characterized in that said external skin incorporates at least one fastener able to collaborate in a disconnectable fashion with a complementary fastener associated with a structure to which it is to be attached.

In this way, by incorporating fasteners directly into the external skin, none of the core is covered or destroyed by the fastener. The acoustic performance is therefore preserved. Furthermore, the fasteners being mounted on the back of the panel, they allow greater adaptability regarding the wall along which the panel must be fastened. This fastening method also respects the bulk allocated to the panel.

"Incorporated" means that the fasteners are at least partially embedded or built in the external skin, and in particular inserted into the plies in the case of a skin made from a composite material.

According to a first alternative form, the fastener is a screw and the complementary fastener is a nut, or vice versa.

According to a second alternative form, the fastener and the complementary fastener form a quick fastener of the quarter-turn type.

According to a third form, the fastener is a nut and the complementary fastener is a screw.

According to a first form, the fastener is incorporated into the external skin by molding, and in particular during a step for molding at least part of the panel.

According to a second form, the fastener is incorporated into the external skin by gluing or welding on the external skin.

According to a third form, the fastener is fastened in the external skin by riveting.

Advantageously, the fastener is incorporated into the external skin by a base.

Advantageously, the acoustic panel comprises a plurality of fasteners, at least part of which is oriented in a direction substantially parallel to an installation direction of the panel.

According to one alternative form, the external skin of the acoustic panel has a curved surface.

Advantageously, the incorporation of the fastener into the external skin has rolling properties around at least one pivot axis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
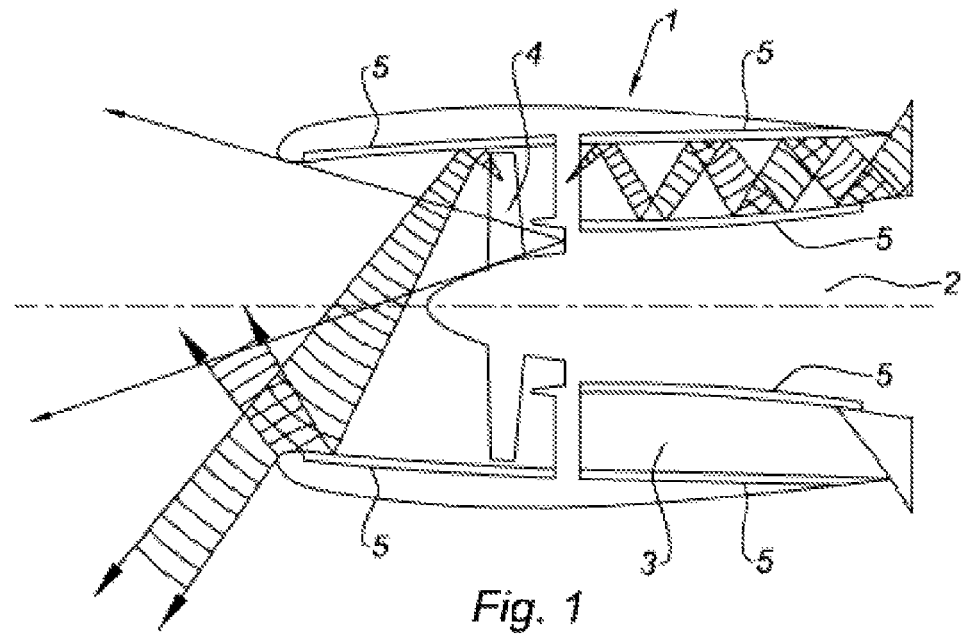
FIG. 1 is a diagrammatic longitudinal cross-sectional view of a turbojet engine nacelle whereof an inner air circulation channel is covered by acoustic panels according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagrammatic cross-sectional illustration of the nacelle 1 of a turbojet engine 2.

This nacelle 1 has a substantially tubular outer structure surrounding the turbojet engine 2 and defining a circulation tunnel 3 for a flow of air around the latter.

FIG. 1 also diagrammatically shows propagation paths for sound waves (areas with crosshatched arrows), in particular generated by the blades of a fan 4 of the turbojet engine 2.

In order to attenuate the sound waves and limit their propagation, the nacelle 1 is equipped, in particular from an air inlet and along the tunnel 3 for the circulation of air, with acoustic panels 5 covering one or more inner walls of the nacelle 1.

Figure 2:
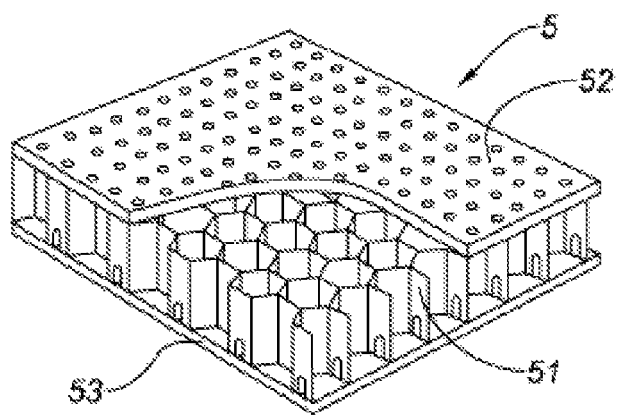
FIG. 2 is a general diagrammatic illustration of an acoustic panel as used in the nacelles.

A typical acoustic panel structure 5 is shown in FIG. 2. Such an acoustic panel 5 typically comprises a honeycomb core 51 comprised between an internal skin 52, which is perforated and designed to be oriented toward the inside of the nacelle 1 so as to receive the sound waves to be absorbed, and an external skin 53, which is solid and designed to allow fastening of the acoustic panel 5.

According to the present disclosure, such an acoustic panel 5 can be attached to the nacelle using fasteners incorporated into the external skin 53.

Figure 3:
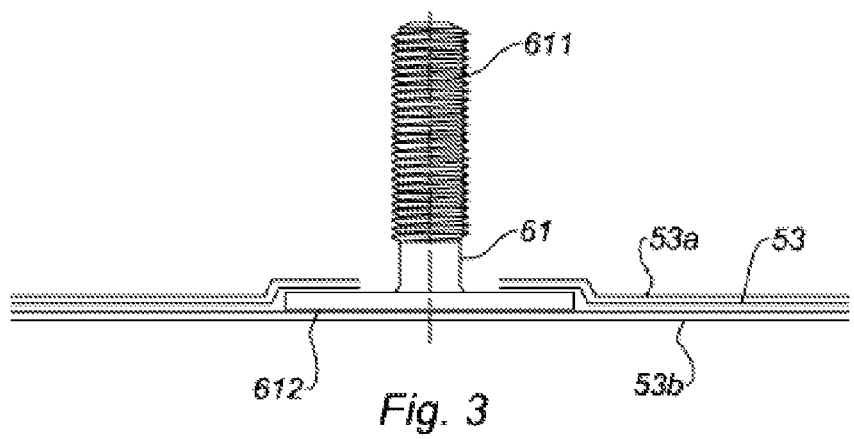
FIGS. 3 and 4 are partial longitudinal cross-sectional views of a rear skin of a first embodiment of an acoustic panel according to the present disclosure.
Figure 4:
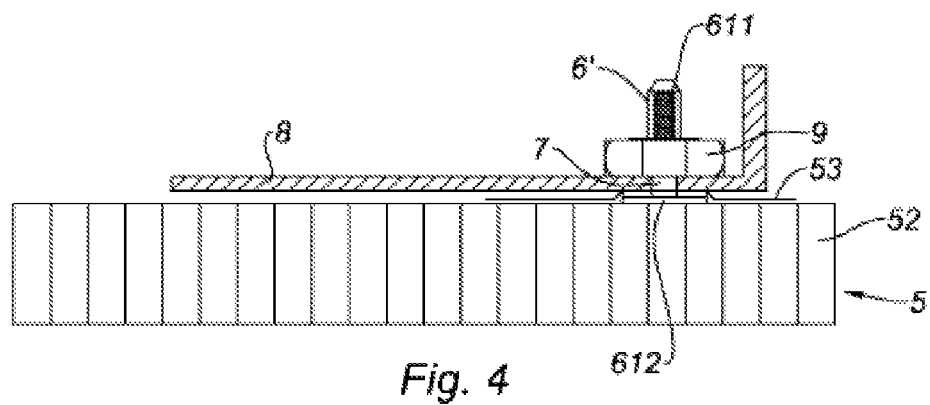
Figure 5:
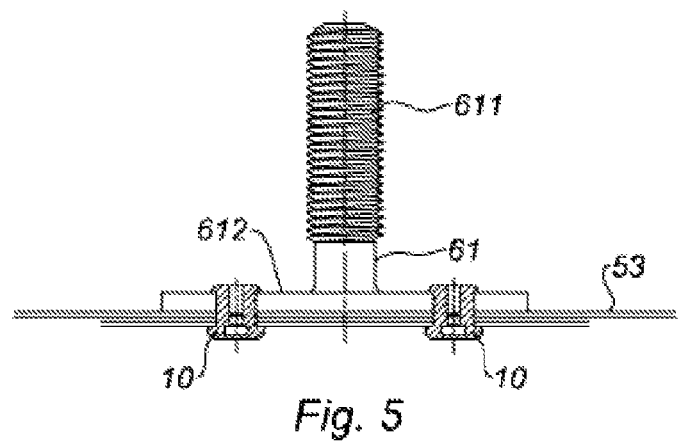
FIG. 5 is a partial longitudinal cross-sectional view of a rear skin of a third embodiment of an acoustic panel according to the present disclosure.

FIGS. 3 to 5 show different forms of such in-built fasteners.

FIG. 3 shows a first form of a fastener equipping an acoustic panel 5. This fastener assumes the form of a screw 65 comprising a threaded head 611 extending from a platen 612 toward the outside of the panel.

According to the present disclosure, the screw 61 is incorporated into the external skin 53 of the acoustic panel 5 by molding said external skin 53 around the platen 612. To that end, the platen 612 will be positioned between one or more internal plies 53b of the external skin 53 and one or more external plies 53a of the external skin 53.

As shown in FIG. 4, the threaded rod 611 is designed to pass through a corresponding opening 7 formed in a wall 8 to which the acoustic panel 5 is to be attached and to receive the corresponding nut 9 so as to secure the fastening while allowing it to be disassembled.

FIG. 5 shows a second method for incorporating the screw 61 equipping the rear skin 53 of the acoustic panel 5. The screw 61 is fastened in the rear skin by placing rivets 10 through the platen 612.

In that case, it will be advantageous to reinforce the rear skin 53 at least locally, in particular through a local increase in the number of plies making up the rear skin 53.

Figure 6:
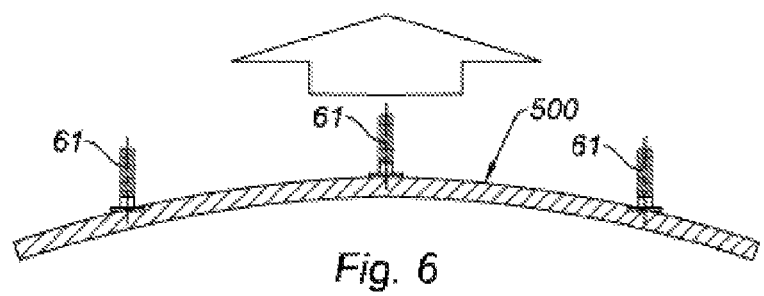
FIGS. 6 to 8 illustrate the case of a curved acoustic panel comprising adapted fasteners according to the present disclosure.
Figure 7:
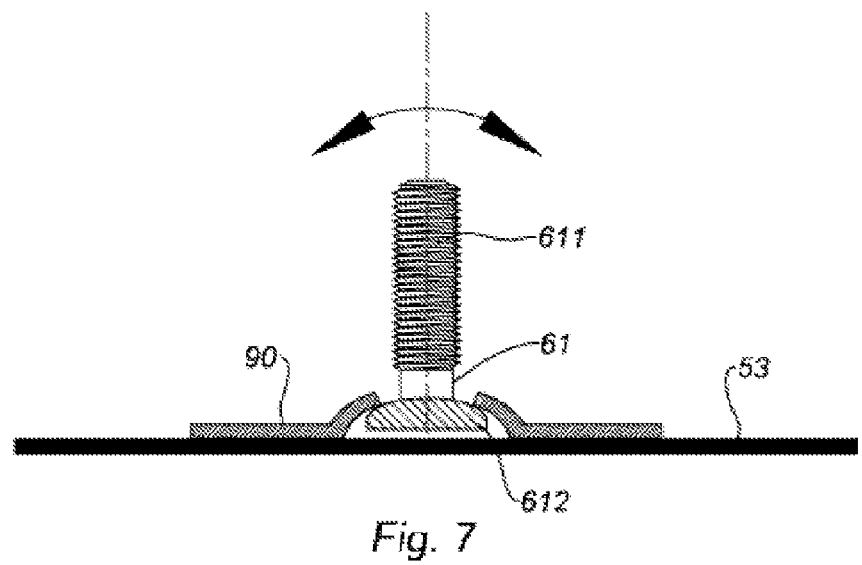
Figure 8:
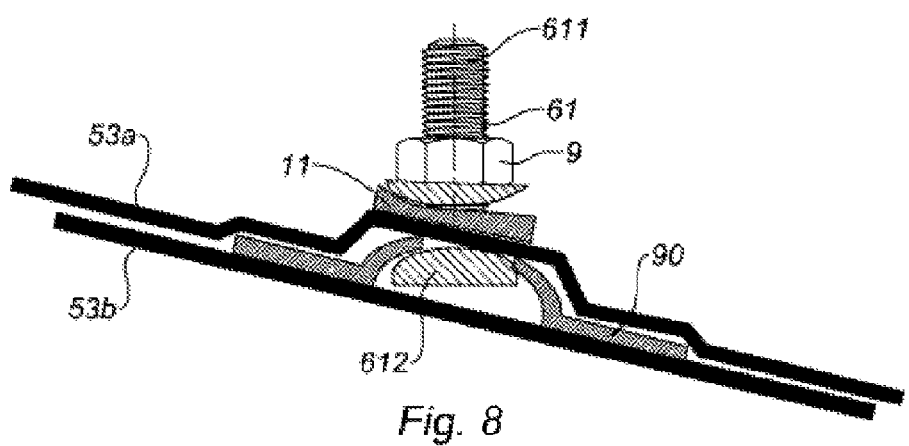

FIGS. 6 to 8 examine the case of a curved acoustic panel 500.

Advantageously for such panels 500, the fasteners, in this case screws 61, will advantageously be oriented in an installation direction (arrow) of the panel 500 and no longer systematically in a direction normal to the panel 500.

The screws 61 may be mounted stationary in this direction or with rolling properties making it possible to orient them.

To that end, and as shown in FIGS. 7 and 8, each screw 61 is movably mounted inside a stationary portion 90 fastened in the rear skin 53, in particular by molding between plies 53a, 53b of the rear skin 53, having a substantially spherical span.

FIG. 8 illustrates the step for fastening the acoustic panel to the wall of the nacelle 1.

In order to ensure proper fastening and good maintenance of the nut 9 and the acoustic panel 5, a shim assembly 11 should be provided making it possible to accommodate the incline of the fastening.

Although the present disclosure has been described with one particular embodiment, it is of course in no way limited thereto and encompasses all technical equivalents of the described means as well as combinations thereof if they are within the scope of the invention.

What is claimed is:

1. An acoustic panel comprising at least one cellular core arranged between at least an internal skin and an external skin, characterized in that said external skin incorporates at least one fastener able to collaborate in a disconnectable fashion with a complementary fastener associated with a structure to which it is to be attached.

2. The acoustic panel according to claim 1, characterized in that the fastener is a screw and the complementary fastener is a nut, or vice versa.

3. The acoustic panel according to claim 1, characterized in that the fastener and the complementary fastener form a quick fastener of the quarterturn type.

4. The acoustic panel according to claim 1, wherein the fastener is incorporated into the external skin by molding during a step for molding at least part of the panel.

5. The acoustic panel according to claim 1, characterized in that the fastener is incorporated into the external skin by gluing or welding on the external skin.

6. The acoustic panel according to claim 1, characterized in that the fastener is fastened in the external skin by riveting.

7. The acoustic panel according to claim 1, characterized in that the fastener is incorporated into the external skin by a base.

8. The acoustic panel according to claim 1, characterized in that it comprises a plurality of fasteners, at least part of which is oriented in a direction substantially parallel to an installation direction of the panel.

9. The acoustic panel according to claim 1, characterized in that the external skin has a curved surface.

10. The acoustic panel according to claim 1, characterized in that the incorporation of the fastener into the external skin has rolling properties around at least one pivot axis.

\* \* \* \* \*